US006864464B2

(12) United States Patent
McWilliams

(10) Patent No.: US 6,864,464 B2
(45) Date of Patent: *Mar. 8, 2005

(54) ELECTRIC HEATER

(75) Inventor: Kevin Ronald McWilliams, Stratford upon Avon (GB)

(73) Assignee: Ceramaspeed Limited (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/461,991

(22) Filed: Jun. 13, 2003

(65) Prior Publication Data

US 2004/0045949 A1 Mar. 11, 2004

(30) Foreign Application Priority Data

Jun. 19, 2002 (GB) ............................................ 0214037

(51) Int. Cl.[7] ................................................ A21B 1/00
(52) U.S. Cl. ....................... 219/400; 219/391; 219/402; 219/408; 219/411; 219/526; 219/542; 219/548
(58) Field of Search ................................ 219/391, 400, 219/404, 402, 408, 411, 526, 536, 542, 548

(56) References Cited

U.S. PATENT DOCUMENTS

| | | | | | |
|---|---|---|---|---|---|
| 3,121,158 A | | 2/1964 | Hurko | | |
| 3,536,457 A | | 10/1970 | Henderson | | |
| 3,785,778 A | * | 1/1974 | Burstein et al. | ............ | 219/400 |
| 5,526,462 A | * | 6/1996 | Kondo et al. | .............. | 219/536 |
| 6,100,503 A | * | 8/2000 | Sasaki et al. | .............. | 219/411 |
| 6,437,294 B2 | * | 8/2002 | Allera et al. | ................ | 219/393 |

FOREIGN PATENT DOCUMENTS

| | | | |
|---|---|---|---|
| GB | 1015049 | | 12/1963 |
| GB | 1130803 | | 1/1967 |
| JP | 02302527 A | * | 12/1990 |
| JP | 030237943 | | 10/1991 |

* cited by examiner

*Primary Examiner*—Joseph Pelham
(74) *Attorney, Agent, or Firm*—Ira S. Dorman

(57) ABSTRACT

An electric heater (2) is arranged for location in an oven (4) intermediate a cavity (6) of the oven and a flue arrangement (8) for venting the cavity (6). The heater (2) comprises a dish-like support (14) containing at least one electric heating element (22) and having a first face (24) open to the cavity (6) and a second face (16; 18) having an aperture (26) adapted to interface with the flue arrangement (8). Catalyst means (28) is provided incorporated in the heater (2).

29 Claims, 5 Drawing Sheets

FIG 3
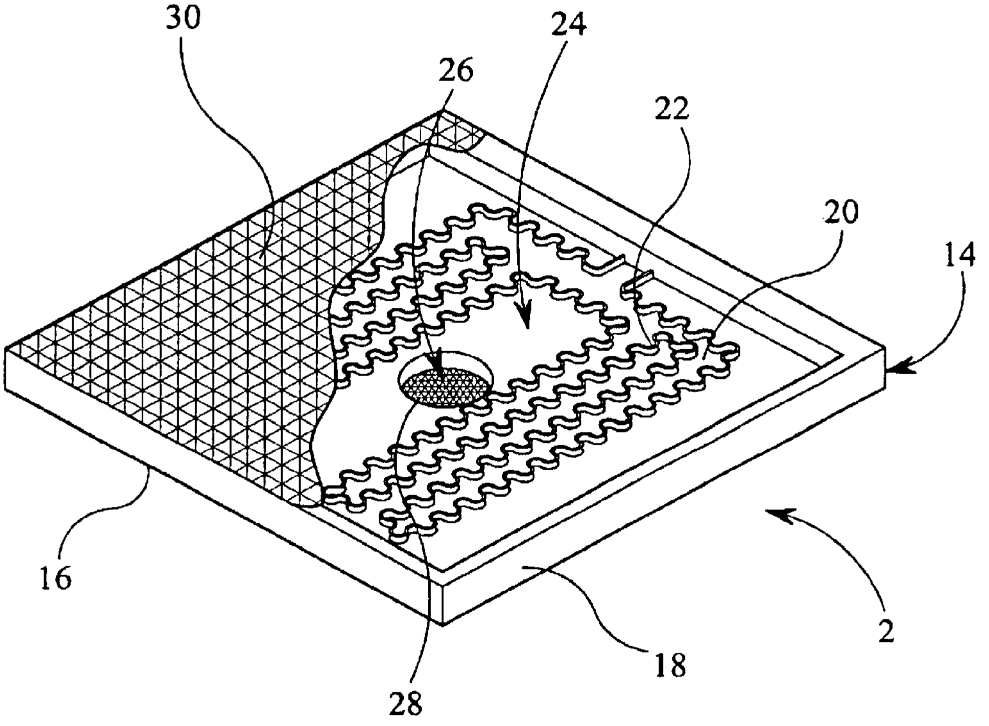
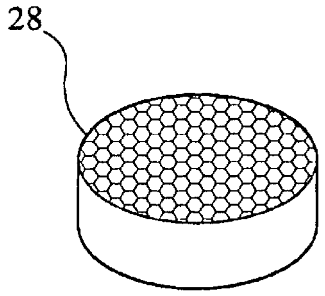
FIG 4A
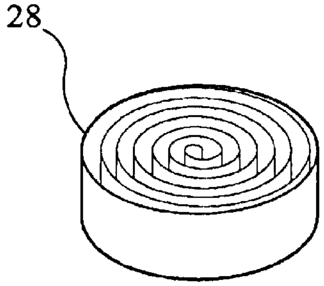
FIG 4B
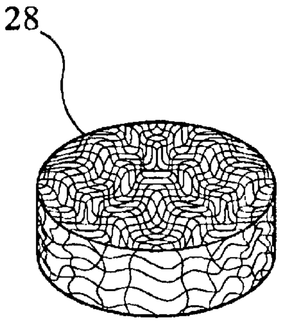
FIG 4C

FIG 5
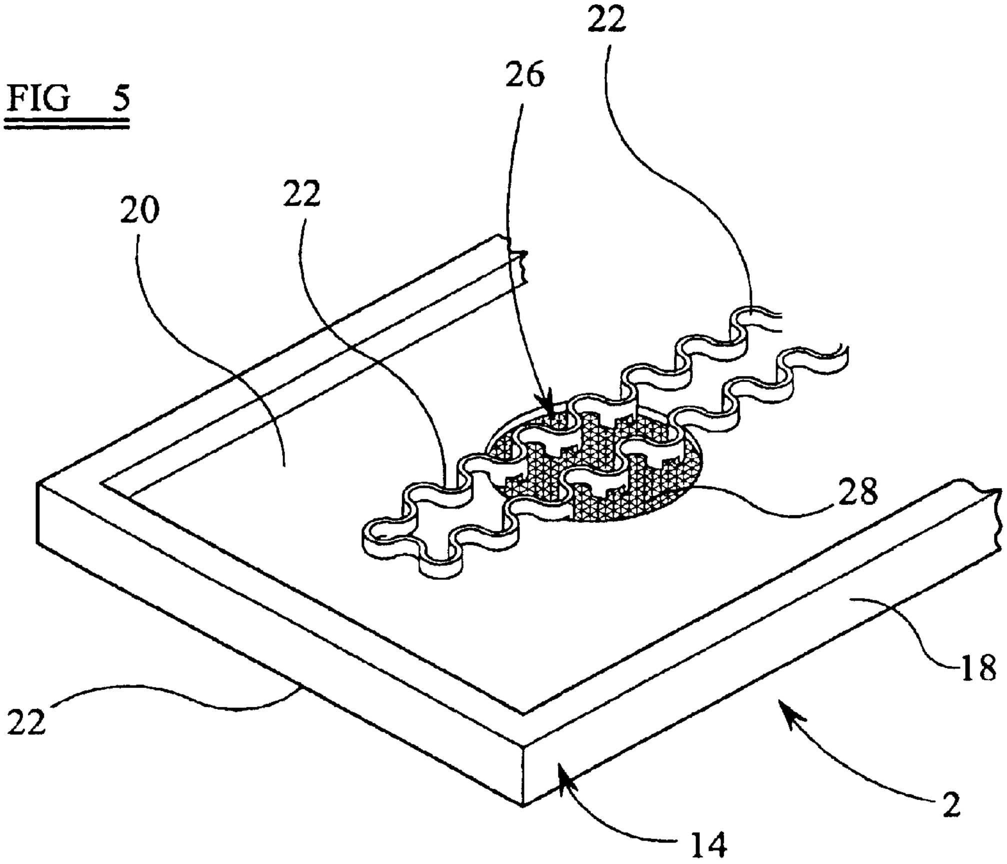
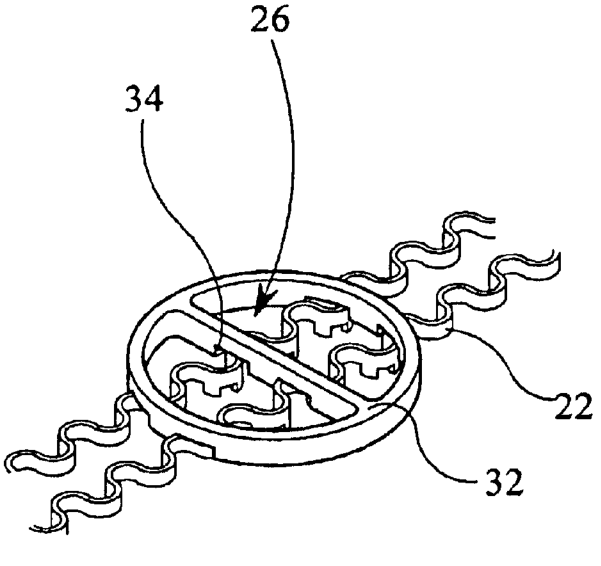
FIG 6A
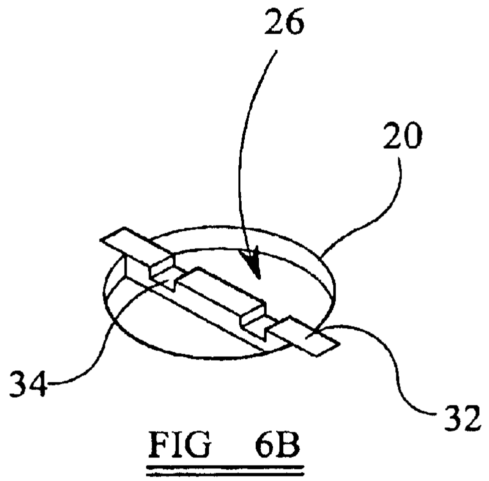
FIG 6B

ELECTRIC HEATER

BACKGROUND TO THE INVENTION

More particularly, the invention relates to an electric heater for an oven in which smoke or fumes are generated in a cavity of the oven and are treated by a catalyst assembly during exit from the oven cavity through a flue arrangement which is provided to vent the oven cavity.

DESCRIPTION OF PRIOR ART

It is well known to provide a catalyst assembly in the flue of an oven to reduce or eliminate smoke or fumes generated either during a normal cooking operation, or during a high temperature self-cleaning cycle effected in the oven. Such a catalyst assembly requires to be heated before it can operate effectively. This is usually achieved by locating the catalyst assembly in the flue sufficiently close to the outlet from the oven such that hot air from the oven heats the catalyst assembly, but such an arrangement is not altogether satisfactory. In another arrangement, a separate heating element, such as of metal-sheathed form, is known to be provided up-stream of the catalyst assembly to more rapidly heat the air approaching the catalyst assembly. However, such an arrangement is expensive to implement.

It is also known to locate a heating element near the top wall of an oven cavity, with part of the element overlying a flue opening provided in the top wall of the oven cavity. A catalyst assembly is again provided in the flue. This can improve the heat-up rate of air entering the flue and thus accelerate heating of the catalyst assembly. However, the heating element and the catalyst assembly are provided as separate components and subsequently mounted relative to the flue. Such an arrangement is inconvenient to implement.

OBJECT OF THE INVENTION

It is an object of the present invention to overcome or minimise the aforementioned disadvantages.

SUMMARY OF THE INVENTION

According to the present invention there is provided an electric heater for location in an oven intermediate a cavity of the oven and a flue arrangement for venting the cavity, the heater comprising a dish-like support containing at least one electric heating element and having a first face open to the cavity and a second face having an aperture adapted to interface with the flue arrangement, catalyst means being provided incorporated in the heater.

The electric heater may be arranged for location at a wall of the oven cavity, such as a wall at the top of the oven cavity and may be adapted for a cooking purpose, such as grilling.

The catalyst means may be adapted to reduce or eliminate passage into the flue arrangement of smoke or fumes generated in the oven cavity.

The aperture adapted to interface with the flue arrangement may be provided in the second face of the dish-like support comprising a base or a peripheral wall of the dish-like support and may include a rimmed portion projecting outwardly from the dish-like support.

The catalyst means may be located at or in the aperture in the base or the peripheral wall of the dish-like support and may be at least partly bordered by thermal insulation material, such as microporous thermal insulation material.

A base layer of thermal insulation material may be provided in the dish-like support and having an opening coinciding with the aperture in the base or the peripheral wall of the dish-like support.

The at least one electric heating element may be supported on or adjacent to the base layer of thermal insulation material and may be arranged with at least one part thereof traversing the opening in the base layer coinciding with the aperture when provided in the base of the dish-like support.

A supporting member, such as of ceramic material, may be arranged in the opening in the base layer for supporting the at least one part of the at least one electric heating element where traversing the opening in the base layer. Such supporting member may be moulded into, or pressed into, the base layer of thermal insulation material.

The catalyst means provided at or in the aperture in the base or the peripheral wall of the dish-like support may comprise catalyst material on a support means. Such support means may comprise a ceramic member of honeycomb form, a helically coiled metal foil member which may be of crinkled form, or a wire or ceramic mesh member.

The electric heater may be provided with at least one apertured member overlying the first face thereof and spaced from the at least one electric heating element. Such apertured member(s) may overlie a peripheral wall of the dish-like support and may comprise woven glass or ceramic fibre or filament material, and/or wire mesh material.

The catalyst means may alternatively be arranged at the first face of the heater, for example overlying the first face of the heater, such as in the form of a mesh comprising or supporting catalyst material, and which may be arranged to overlie a peripheral wall of the dish-like support. At least one apertured member, such as of woven glass or ceramic fibre or filament material, and/or wire mesh material, may be additionally provided overlying the catalyst means at the first face of the heater.

In a further alternative embodiment, the catalyst means may comprise a coating on at least part of the at least one electric heating element.

The catalyst means may comprise one or more catalyst materials selected from platinum, palladium, osmium, iridium, ruthenium and rhodium and mixtures thereof.

The at least one electric heating element may be of ribbon, wire, foil, lamp or metal-sheathed form.

The dish-like support of the heater may comprise metal.

A fan means may be provided associated with the flue arrangement in the oven.

For a better understanding of the present invention and to show more clearly how it may be carried into effect, reference will now be made, by way of example, to the accompanying drawings in which:

BRIEF DESCRIPTION OF THE DRAWINGS

FIG. 3 is a plan view of the electric heater provided in the ovens of FIGS. 1 and 2;

FIGS. 4A, 4B and 4C are perspective views of alternative catalyst means for use in the heater of FIG. 3;

FIG. 5 is a plan view of an alternative arrangement of a heating element in the heater of FIG. 3;

FIGS. 6A and 6B are perspective views of embodiments of supporting members for use in the arrangement of FIG. 5;

DESCRIPTION OF PREFERRED EMBODIMENTS

Figure 1:
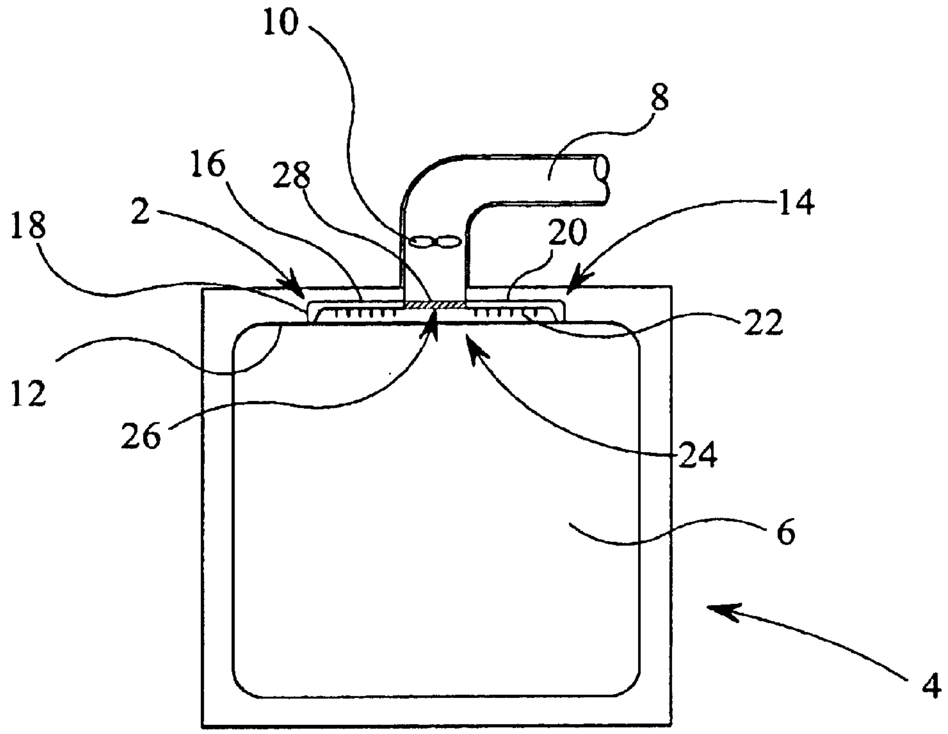
FIG. 1 is a cross-sectional view of an oven provided with an embodiment of an electric heater according to the present invention located outside an oven cavity.
Figure 2:
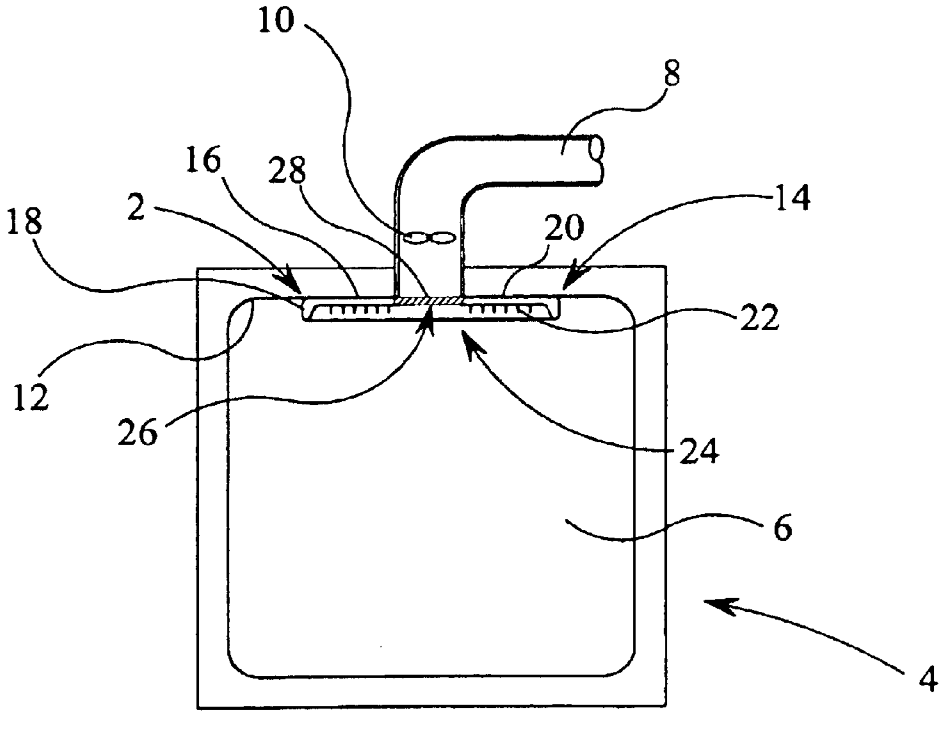
FIG. 2 is a cross-sectional view of an oven provided with an embodiment of an electric heater according to the present invention located inside an oven cavity.

Referring to FIGS. 1 to 3, a radiant electric heater 2 is located in an oven 4, for example for performing a grilling or other cooking function. The heater 2 is located in the oven 4 intermediate a cavity 6 of the oven and a flue arrangement 8 for venting the cavity 6. Such venting of the cavity 6 is required as a result of smoke or fumes being generated in the cavity 6 during a cooking operation or during a high temperature self-cleaning cycle effected in the cavity 6. A fan 10 may be provided in the flue arrangement 8 to promote exit of air through the flue arrangement 8.

The oven 4 of FIG. 1 has the heater 2 located at the top of the oven cavity 6 in a recess in a top wall 12 of the cavity 6, whereas the oven 4 of FIG. 2 has the heater 2 located at the top of the oven cavity 6, inside the oven cavity 6 and against the top wall 12 thereof.

The heater 2 is arranged in the oven 4 between the cavity 6 of the oven and the flue arrangement 8 and comprises a dish-like support 14, such as of metal, having a base 16 and a peripheral wall 18. A base layer 20 of thermal insulation material, such as microporous thermal insulation material, is provided inside the dish-like support 14.

At least one electric heating element 22 is supported on or adjacent to the base layer 20. Such heating element or elements 22 can comprise any of the well-known forms, such as ribbon, wire, foil, lamp or metal-sheathed forms, or combinations thereof. As illustrated, the heating element 22 is provided of corrugated metal ribbon form.

The heater 2 has a front face 24 open to the oven cavity 6 and has an aperture 26 extending through the base 16 of the dish-like support 14 and the base layer 20 and interfacing with the flue arrangement 8.

A catalyst means 28 is incorporated in the heater 2 and is arranged in the aperture 26 and bordered by the base layer 20 of thermal insulation material. Such catalyst means 28 is heated by air drawn through the heater 2 from the oven cavity 6 into the flue arrangement 8. The catalyst means 28 comprises a catalytically active material which, when heated and contacted by smoke or fumes from the oven cavity 6, operates to reduce or eliminate the smoke or fumes which are generated in the cavity 6 during a cooking operation or during a high temperature self-cleaning cycle effected in the oven cavity 6.

The catalyst means 28 suitably comprises a catalyst material on a support. Such catalyst material may, for example, comprise one or more of platinum, palladium, osmium, iridium, ruthenium and rhodium, preferably platinum.

Examples of catalyst means 28 are illustrated in FIGS. 4A, 4B and 4C. In FIG. 4A, the catalyst means 28 comprises a ceramic member of honeycomb form coated with catalyst material. In FIG. 4B, the catalyst means 28 comprises a helically coiled metal foil member, such as of crinkled or corrugated form, coated with catalyst material. In FIG. 4C, the catalyst means 28 comprises a wire or ceramic mesh member coated with catalyst material.

For effective operation, the catalyst means 28 must be heated to and maintained at as high a temperature as possible. This is assisted by the thermally insulating base layer 20 which surrounds the catalyst means in the heater 2.

The electric heater 2 can be provided with at least one apertured member 30 overlying the front face 24 of the heater 2 and spaced from the heating element or elements 22. Such one or more apertured members 30 is or are arranged to be permeable to smoke and/or fumes generated in the oven cavity 6 and suitably overlie(s) the peripheral wall 18 of the dish-like support 14 of the heater 2. The one or more apertured members 30 suitably comprise(s) woven glass or ceramic fibre or filament material and/or wire mesh material.

Referring now to FIG. 5, in order to ensure that air passing through the catalyst means 28 is heated to as high a temperature as possible, at least part of the heating element or elements 22 is arranged to traverse the aperture 26 in which the catalyst means 28 is provided. To prevent sagging of the at least part of the heating element 22 where crossing the aperture 26, a support member 32, such as of ceramic material, can be provided, as shown in FIGS. 6A and 6B. In FIG. 6A, the support member 32 is in the form of a frame arranged in the aperture 26 in the heater 2 and provided with recesses 34 for receiving and supporting the heating element 22. In FIG. 6B, the support member 32 is in the form of a beam across the aperture 26 in the heater 2 and provided with recesses 34 for receiving and supporting the heating element 22. The support member 32 in FIGS. 6A and 6B may be moulded into, or pressed into, the base layer 20 of thermal insulation material.

Figure 7A:
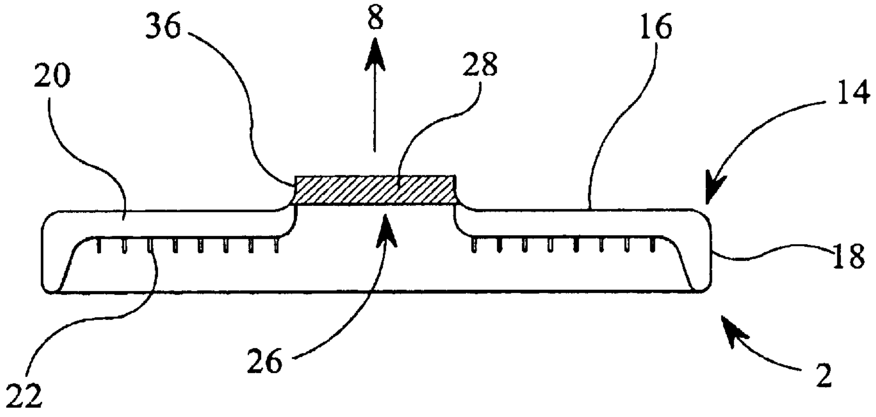
FIGS. 7A and 7B are cross-sectional views of alternative aperture arrangements in a dish-like support of a heater of the present invention.
Figure 7B:
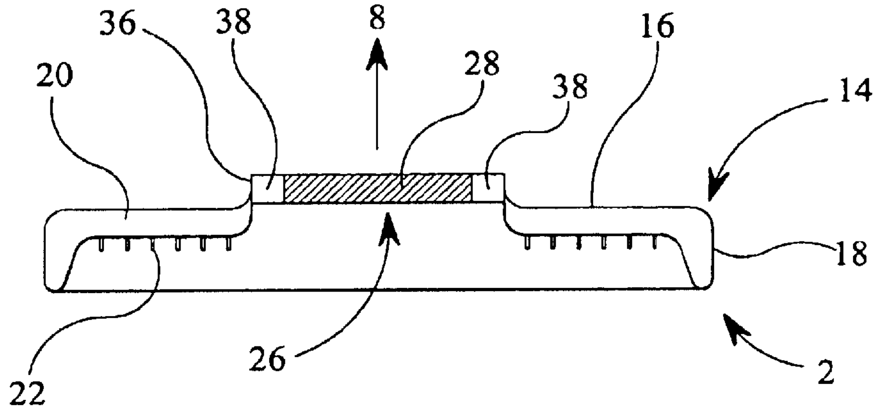

Referring now to FIGS. 7A and 7B, the aperture 26 in the base 16 of the dish-like support 14 may include a rimmed portion 36 projecting outwardly from the dish-like support 14 and supporting the catalyst means 28. As shown in FIG. 7B, the catalyst means 28 is bordered by thermal insulation material 38, for example microporous thermal insulation material, in the rimmed portion 36 of the aperture 26 in the dish-like support 14. Such thermal insulation material 38 assists in maintaining the catalyst means 28 at as high a temperature as possible.

Figure 8:
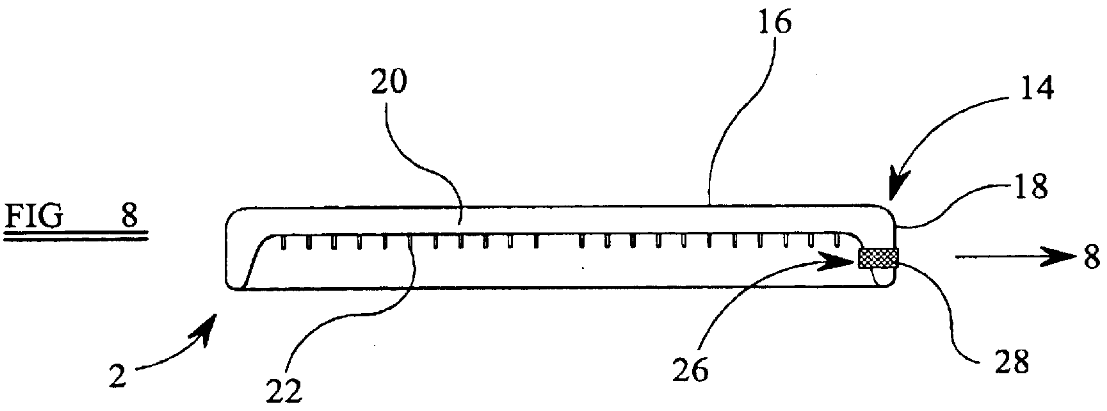
FIG. 8 is a cross-sectional view of an alternative embodiment of an electric heater according to the present invention, having an aperture provided in a peripheral wall thereof.

Referring now to FIG. 8, instead of the aperture 26 and the catalyst means 28 being provided in the base 16 of the dish-like support 14 of the heater 2, the aperture 26 and the catalyst means 28 are provided in the peripheral wall 18 of the dish-like support 14 and interfacing with the flue arrangement 8. The flue arrangement 8 is arranged for sideways connection to the heater 2. The catalyst means 28 is bordered by thermal insulation material of the base layer 20.

Figure 9:
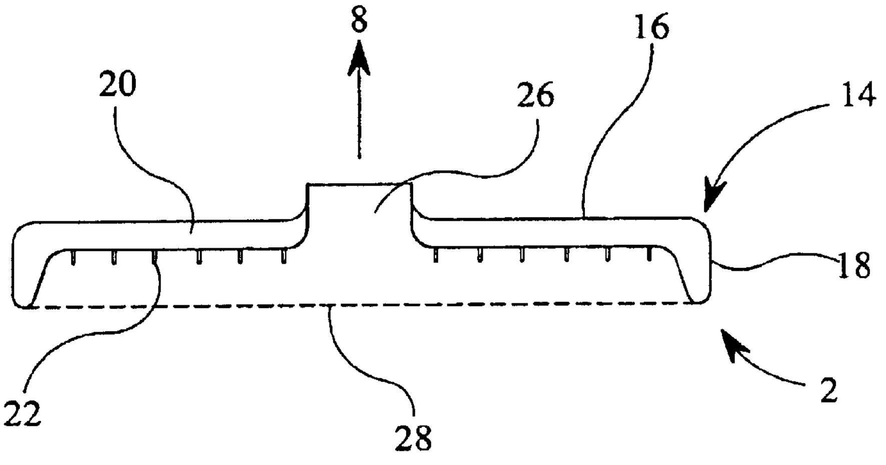
FIG. 9 is a cross-sectional view of a further embodiment of an electric heater according to the present invention.

An alternative embodiment of the heater 2 of the present invention is shown in FIG. 9. This is substantially the same as the heater shown in FIG. 3 with the important difference that, instead of the catalyst means 28 being provided in the aperture 26 through the base 16 of the dish-like support 14, the catalyst means 28 is arranged to overlie the front face of the heater 2, suitably in the form of a mesh permeable to smoke and/or fumes and comprising or supporting catalyst material. Such catalyst means 28 suitably overlies the peripheral wall 18 of the dish-like support 14 and is heated to an effectively high temperature by direct radiation from the heating element or elements 22.

Figure 10:
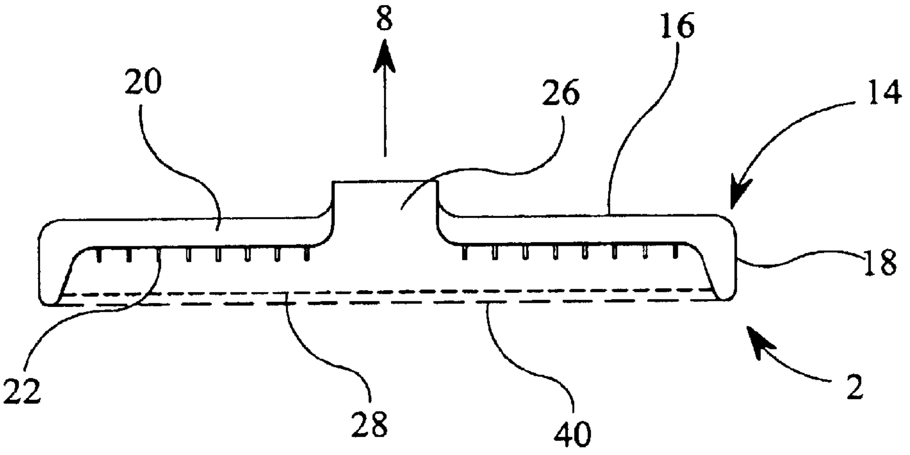
FIG. 10 is a cross-sectional view of an alternative arrangement of catalyst means in the heater of FIG. 9.

In a modification of the heater 2 of FIG. 9, as shown in FIG. 10, at least one apertured member 40, such as of woven glass or ceramic fibre or filament material and/or wire mesh material, is additionally provided overlying the catalyst means 28 at the front face of the heater. Such apertured member(s) 40 must of course be permeable to smoke and/or fumes from the oven cavity.

Figure 11:
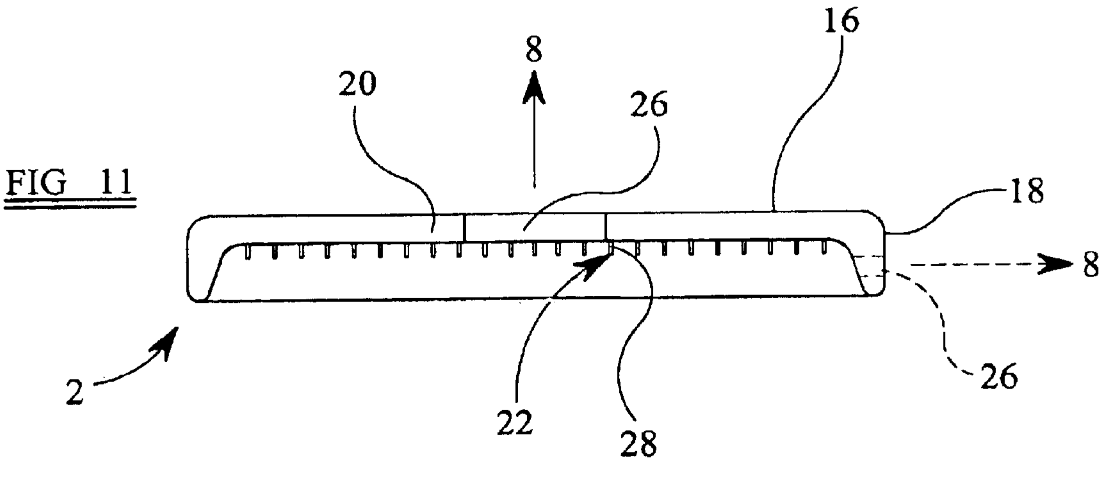
FIG. 11 is a cross-sectional view of a still further embodiment of an electric heater according to the present invention.

A further embodiment of the heater 2 is illustrated in FIG. 11. The heater 2 of FIG. 11 is similar to that of FIG. 3 or FIG. 5, with the significant difference that, instead of the catalyst means 28 being provided in the aperture through the base 16 of the dish-like support 14 (or indeed through the peripheral wall 18 of the dish-like support 14 as shown in FIG. 8), the catalyst means is arranged as a coating of catalyst material on the surface of at least part of the heating element or elements 22. In particular, where part of the heating element or elements 22 traverses the aperture 26 through the base 16 of the dish-like support 14, as shown in FIG. 5, the catalyst means 28 may be substantially confined to the surface of that part of the heating element or elements 22 overlying the aperture 26.

I claim:

1. An electric heater for location in an oven intermediate a cavity of the oven and a flue arrangement for venting the cavity, the heater comprising a dish-like support containing at least one electric heating element and having a first face open to the cavity and a second face having an aperture adapted to interface with the flue arrangement, catalyst means being provided incorporated in the heater.

2. The heater of claim 1, wherein the aperture adapted to interface with the flue arrangement is provided in the second face of the dish-like support selected from a base and a peripheral wall of the dish-like support.

3. The heater of claim 2, wherein the aperture includes a rimmed portion projecting outwardly from the dish-like support.

4. The heater of claim 2, wherein the catalyst means is located at or in the aperture in the base or the peripheral wall of the dish-like support.

5. The heater of claim 4, wherein the aperture is at least partly bordered by thermal insulation material.

6. The heater of claim 5, wherein the thermal insulation material comprises microporous thermal insulation material.

7. The heater of claim 2, wherein a base layer of thermal insulation material is provided in the dish-like support and having an opening coinciding with the aperture in the base or the peripheral wall of the dish-like support.

8. The heater of claim 7, wherein the at least one electric heating element is supported on or adjacent to the base layer of thermal insulation material.

9. The heater of claim 8, wherein the at least one electric heating element is arranged with at least one part thereof traversing the opening in the base layer coinciding with the aperture when provided in the base of the dish-like support.

10. The heater of claim 9, wherein a supporting member is arranged in the opening in the base layer for supporting the at least one part of the at least one electric heating element where traversing the opening in the base layer.

11. The heater of claim 10, wherein the supporting member comprises ceramic material.

12. The heater of claim 11, wherein the supporting member is moulded into, or pressed into, the base layer of thermal insulation material.

13. The heater of claim 2, wherein the catalyst means provided at or in the aperture in the base or the peripheral wall of the dish-like support comprises catalyst material on a support means.

14. The heater of claim 13, wherein the support means is selected from a ceramic member of honeycomb form, a helically coiled metal foil member, a wire mesh member, and ceramic mesh member.

15. The heater of claim 14, wherein the metal foil member is of crinkled form.

16. The heater of claim 1, wherein there is provided at least one apertured member overlying the first face thereof and spaced from the at least one electric heating element.

17. The heater of claim 16, wherein the apertured member(s) overlie(s) a peripheral wall of the dish-like support.

18. The heater of claim 17, wherein the at least one apertured member is selected from woven glass filament material, woven ceramic filament material and wire mesh material, and combinations thereof.

19. The heater of claim 1, wherein the catalyst means is arranged at the first face of the heater.

20. The heater of claim 19, wherein the catalyst means overlies the first face of the heater.

21. The heater of claim 20, wherein the catalyst means is in the form of a mesh comprising or supporting catalyst material.

22. The heater of claim 20, wherein the catalyst means overlies a peripheral wall of the dish-like support.

23. The heater of claim 19, wherein at least one apertured member is additionally provided overlying the catalyst means at the first face of the heater.

24. The heater of claim 23, wherein the at least one apertured member is selected from woven glass filament material, woven ceramic filament material and wire mesh material, and combinations thereof.

25. The heater of claim 1, wherein the catalyst means comprises a coating on at least part of the at least one electric heating element.

26. The heater of claim 1, wherein the catalyst means comprises one or more catalyst materials selected from platinum, palladium, osmium, iridium, ruthenium, rhodium and mixtures thereof.

27. The heater of claim 1, wherein the at least one electric heating element is selected from ribbon, wire, foil, lamp and metal-sheathed form.

28. The heater of claim 1, wherein the dish-like support comprises metal.

29. The heater of claim 1, wherein a fan means is provided associated with the flue means.

* * * * *